United States Patent Office 3,311,048
Patented Mar. 28, 1967

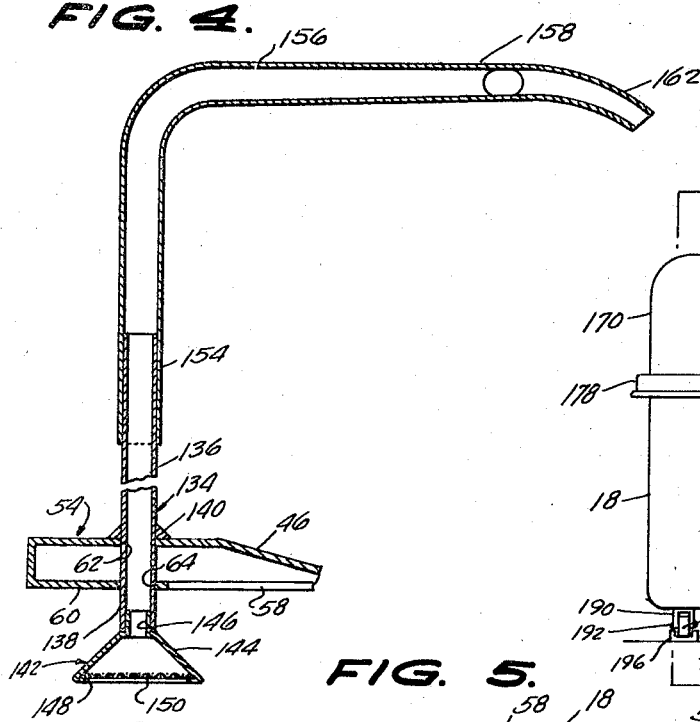

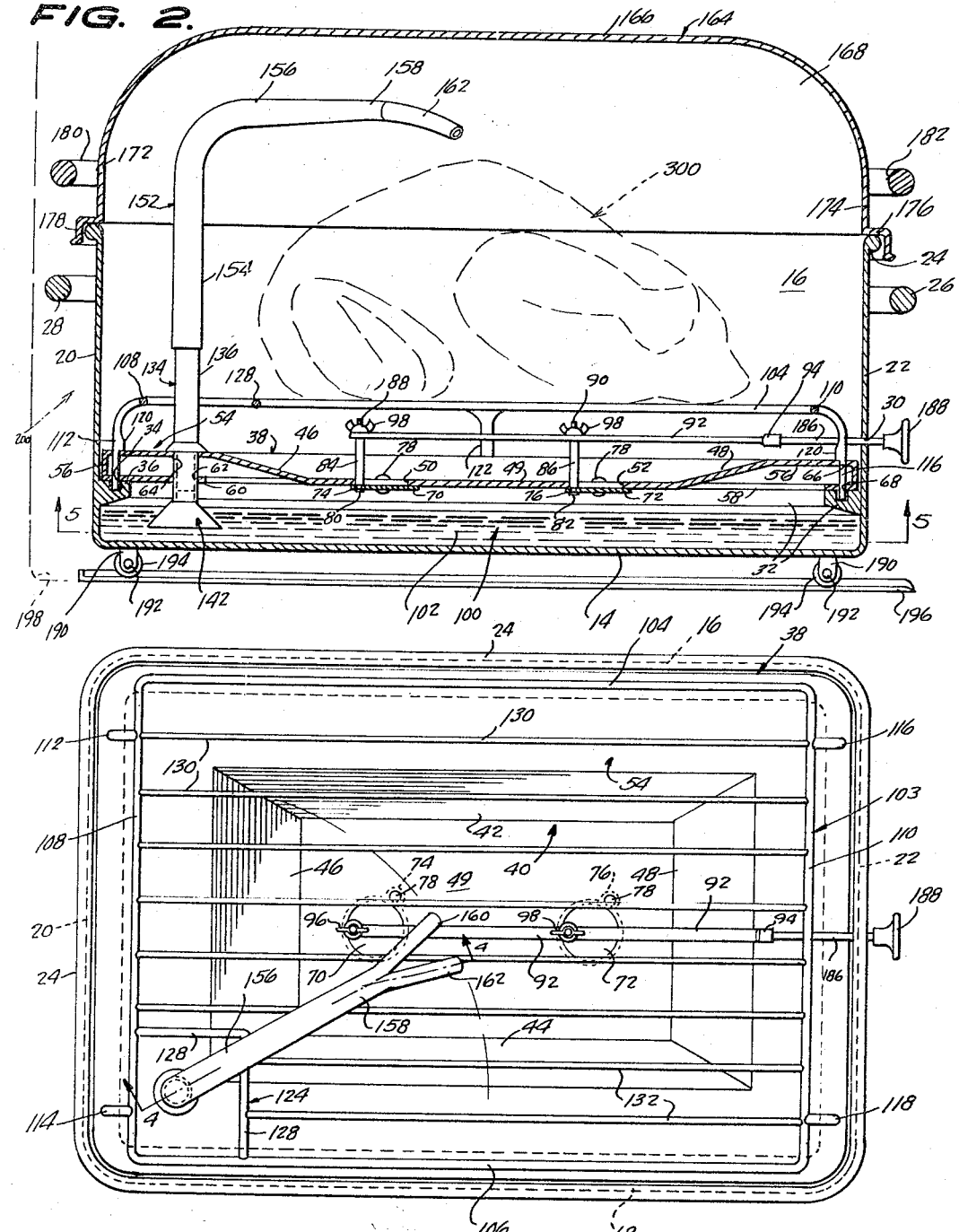

3,311,048
COOKING UTENSIL WITH BASTING APPARATUS
John J. Pickering, 102 Barrett Ave.,
North Providence, R.I. 02904
Filed Oct. 12, 1965, Ser. No. 495,099
6 Claims. (Cl. 99—346)

This invention relates to the culinary arts and, more specifically, the present invention is directed to the provision of a cooking utensil having associated therewith apparatus for basting fowl or meats.

One of the primary objects of this invention is to provide a cooking utensil together with means for collecting basting fluids and to subsequently withdraw said basting fluids from the collecting means for discharge over the meat or fowl being cooked.

Another object of this invention is to provide a cooking utensil of the meat or fowl roasting type with a chamber for collecting liquid or fluid basting material together with means for substantially continuously withdrawing the basting liquids or fluids from the chamber for discharge over the fowl or meat being roasted.

A still further object of this invention is to provide a cooking utensil for roasting meats or fowl, the utensil being provided with a basting plate to receive and collect basting liquids or fluids, the basting plate being provided with valve means to permit basting fluids or liquids to descend into a compartment formed in the utensil when not actually being applied to meat or fowl being cooked.

Still another object of this invention is to provide a cooking utensil in the nature of a meat or fowl roasting container, the container being provided with a meat or fowl supporting grill whereby the food being cooked is held in spaced relationship relative to the utensil and wherein means are provided for substantially continuously supplying the basting liquids or fluids to the meat or fowl being cooked.

This invention contemplates, as a still further object thereof the provision of a cooking utensil as generally described supra, the utensil and its associated apparatus being non-complex in construction and assembly, inexpensive to manufacture and maintain, and which is durable in use.

Other and further objects of the instant invention will become more manifest from a consideration of the following specification when read in conjunction with the annexed drawings, in which:

FIGURE 1 is an end elevational view of a cooking utensil constructed in accordance with this invention;

FIGURE 2 is an enlarged detail cross-sectional view, FIGURE 2 being taken substantially on the vertical plane of line 2—2 of FIGURE 1, looking in the direction of the arrows;

FIGURE 3 is a top plan view of the roasting pan section of the cooking utensil shown in FIGURE 1, the cover member therefor having been removed;

FIGURE 4 is an enlarged fragmentary detail cross-sectional view, FIGURE 4 being taken substantially on the vertical plane of line 4—4 of FIGURE 3, looking in the direction of the arrows;

FIGURE 5 is a bottom plan view of the basting plate and associated apparatus, FIGURE 5 being partly in cross-section and being taken substantially on the horizontal plane of line 5—5 of FIGURE 2, looking in the direction of the arrows; and FIGURE 6 is a fragmentary detail bottom plan view illustrating one of the disc valves as being moved from its closed position shown in FIGURE 5 to its open position.

Referring now more specifically to the drawings, reference numeral 10 designates, in general, an elongated substantially rectangular covered cooking utensil constructed in accordance with the teachings of this invention and especially adapted for roasting meat or fowl, the utensil being provided with means for effecting the automatic and continuous basting of the food being roasted in the utensil 10. As is seen in FIGURE 1, the utensil 10 includes a substantially hollow rectangular roasting pan 12 having an elongated substantially rectangular bottom wall 14 (see FIGURES 1 and 2) from the opposed longitudinally extending marginal edges of which upwardly extend an opposed pair of integrally formed laterally spaced substantially parallel rectangular side walls 16, 18 (see FIGURES 3 and 5). The bottom wall 14 is also provided with integrally formed substantially upright pairs of rectangular end walls 20, 22 projecting from the marginal edges thereof and which are integral with and extend between adjacent pairs of ends of the side walls 16, 18. The upper ends of the side and end walls terminate in a conventional continuous peripheral bead 24. To each end wall adjacent the upper ends thereof is fixedly secured an outwardly and laterally projecting handle member 26, 28 having the usual construction and configuration. To serve a function to be described, the end wall 22 is provided with a transversely extending opening 30 vertically spaced above the bottom wall 14 and centrally located between the side walls 16, 18.

Integrally with and projecting laterally from the side and end walls 16, 18 and 20, 22, respectively, and extending into the roasting pan 12 is an integrally formed open substantially rectangular continuous flange 32. The flange 32 is formed with an endless substantially U-shaped channel 34 which opens into the upper side or plane 36 thereof.

The flange 32, as seen in FIGURE 2, is disposed in vertically spaced and substantially parallel relation relative to the bottom wall 14 and serves as support means for an elongated substantially rectangular basting plate 38.

The basting plate 38 is seen to comprise (see FIGURES 2, 3 and 5) an inverted substantially frusto-pyramidic central section 40 having a pair of opposed downwardly converging elongated side walls 42, 44 having opposed pairs of ends integrally connected by a pair of downwardly converging end walls 46, 48. Disposed substantially in the plane of the frustum of the central section 40 is a normally horizontal, elongated substantially rectangular closure wall 49 having a pair of longitudinally spaced transversely extending circular openings 50, 52 formed therein with a diameter thereof falling on the center line of the closure wall 49. The upper ends of the side and end walls 42, 44 and 46, 48, respectively, terminate in an outwardly flaring continuous integrally formed flange 54 having a rectangular configuration. From the outer marginal edge of the flange 54 downwardly projects a continuous peripheral spacer flange 56. The lower end of the flange 56 is integral with a reverted continuous bearing flange 58 that extends under the flange 54 in vertically spaced and parallel relation relative thereto. The flange 58, adjacent a corner thereof, is provided with an integrally formed inwardly projection substantially rectangular gusset plate 60 that extends parallel to the flange 54 also in vertically spaced relation relative thereto. The flange 54 and gusset plate 60 are provided with concentric transversely extending openings 62, 64, respectively (see FIGURE 4), to serve a function to be described. The opposed end portions of adjacent flanges 54, 58 adjacent their respective corners are formed with coaxially aligned transversely extending pairs of openings 66, 68, respectively (see FIGURE 2), which also serve a function to be described, infra.

As is shown in FIGURES 2 and 5, the openings 50, 52 are adapted to be opened and closed by disc valves 70, 72, respectively, which slide and seal against the underside of the closure wall 49. The disc valves 70, 72 are each formed with tabs 74, 76, respectively, which extend from the circumferences thereof in offset relation to one side of the longitudinal axis of the closure wall 49. A rivet type pivot pin 78 extends through each tab 74, 76, respectively, and adjacent portions of the closure wall 49 to secure the disc valves 70, 72 to the closure wall 49 for horizontal swinging movement across and away from the openings 50, 52.

As is seen in FIGURES 2 and 3, any conventional fastening means 80, 82 may be employed to connect the lower ends of a pair of upright standards 84, 86, respectively, to the valve discs 70, 72, the standards projecting upwardly through the adjacent openings 50, 52 with their respective vertical axes being disposed on or adjacent to the longitudinal axis of the closure wall 49 with the aforesaid axes extending parallel to one another. As is clearly seen in FIGURE 2, the standards 84, 86 project above the flange 54.

The standards 84, 86 adjacent their respective upper threaded ends 88, 90 are connected to one end of an elongated substantially flat rectangular valve operating lever 92, the lever 92 extending substantially parallel to the closure wall 49 in vertically spaced relation relative thereto and in vertically spaced relation relative to the end wall 48. To serve a function to be described, the other end of the lever 92 terminates in a coupler device such as, for example, the socket 94 (see FIGURES 2 and 3). The threaded upper ends 88, 90 of the standards 84, 86 are releasably connected to the lever 92 as by the wing nuts 96, 98.

As is clearly illustrated in FIGURE 2, basting plate 38 is disposed within the roasting pan 12 with the bearing flange 58 resting and being seated on the flange 32 in spaced relation relative to the bottom wall 14 and defining, together with intermediate adjacent portions of the side and end walls 16, 18 and 20, 22, respectively, a substantially hollow chamber 100 which normally receives the basting fluid or liquid 102. It is preferable that the basting liquid 102 substantially fill the chamber 100 to a height not to exceed the height of the flange 32 above the bottom wall 14.

Reference numeral 103 designates, in general, an open elongated substantially rectangular grill (see FIGURE 3) which includes a pair of oppositely disposed laterally spaced and parallel elongated side rods 104, 106 connected at each adjacent pair of ends by end rods 108, 110. Fixedly secured to the end rods 108, 110 adjacent their respective ends are depending legs 112, 114 and 116, 118, respectively, each of which are formed intermediate their respective ends with inwardly projecting axially extending shoulders 120. The legs 112 are of such length as to slidably extend downwardly through the aligned pairs of openings 66, 68 for entry in the channel 34 formed in the flange 32, the shoulders 120 engaging against the upper sides of the opposed ends of the flange 54 to serve as limiting means preventing further downward movement of the legs 112, 114, and 116, 118. As is shown in FIGURE 2, the legs 112, 114 and 116, 118 support the grill 103 in vertcially spaced relation relative to the basting plate 38, and this spaced relation is further maintained by providing studs 122 which depend from the side rods 104, 106 intermediate their respective ends and engage, at their lower ends against the opposed longitudinally extending sides of the flange 54. The grill 103 is also provided with an L-shaped angle rod 124 having the outer end of the foot section 126 fixedly connected to the end rod 108 and the outer end of the leg section 128 is fixedly secured to the side rod 106. A plurality of first elongated laterally spaced and parallel stringer rods 130 extend betwen and have one of their respective ends fixedly secured to the end rods 108, 110, and second elongated laterally spaced and parallel stringer rods 132 have one of their respective ends fixedly secured to the end rod 110 while their other ends extend to and are rigidly connected to the leg section 128. To serve a function to be described, the angle rod 124 and the portions of the side and end rods 106, 108, respectively, included therebetween circumscribe the opening 64 in vertically spaced relation relative thereto.

Referring now more specifically to FIGURE 4, reference numeral 134 indicates a vertically elongated substantially hollow cylindrical conduit releasably engageable within the openings 62, 64 formed in the flange 54 and the gusset plate 60. The conduit 134 has upper and lower end portions 136, 138, respectively, which when the conduit 134 is in its position shown in FIGURES 2 and 4, extend above and below the flange 54 and the gusset plate 60. Downward movement of the conduit 134 within the openings 62, 64 is limited by the annular stop collar 140 rigidly secured thereto intermediate its ends and which normally engages against the upper surface of the flange 54. As seen from a consideration of FIGURE 2, the upper end 136 of the conduit 134 projects upwardly between and above the foot and leg sections 126, 128, respectively, of the angle rod 124 and the sections of the side and end rods 106, 108 embraced thereby and extends well above the grill 103.

Reference numeral 142 denotes a downwardly opening funnel having a substantially hollow frusto-conical end wall 144 from the upper end of which coaxially extends a substantially hollow cylindrical connector stem 146 that is releasably secured in a snug friction fit within the lower end portion 138 of the conduit 134. The connection is such that the side wall 144 is disposed within the chamber 100 and is normally immersed within the basting fluid or liquid 102. The base end of the side wall 144 is provided with an inwardly extending annular flange 148 on which is seated a substantially circular filter element or screen 150. As seen in FIGURE 4, upward movement of the filter element or screen 150 is prevented by that portion of the side wall 144 that is immediately adjacent the flange 148 and overhangs the same.

Reference numeral 152 denotes an adjustable L-shaped basting fluid or liquid distributing conduit having a leg section 154 snugly telescoped over the upper end section 136 of the conduit 134 concentric therewith, the connection between the leg section 154 and conduit 134 being of the friction type to hold the upper end section 136 in vertically adjusted position relative to the upper end section 136. The mounting is such that in addition to the vertical adjustment, the leg section 154 may also be rotated about its axis and the axis of the conduit 134. The upper end of the leg section 154 continues into an offset foot section 156 which is gradually flattened adjacent its outer end into an oval configuration (see FIGURE 4). The foot section 156 normally overhangs the grill 103 in vertically spaced relation relative thereto, and its outer end 158 is bifurcated to provide a pair of outwardly diverging downwardly bent nozzles 160, 162. As is clearly shown in FIGURE 2, the upper end of the leg section 154 and foot section 156 may be vertically adjusted to extend above the open upper end of the roasting pan 12, the open end being closed by conventionally elongated substantially hollow rectangular cover member 164 that includes an elongated substantially rectangular top wall 166 from the marginal edges of which depend a pair of integrally formed elongated and laterally spaced side walls 168, 170 and end walls 172, 174, respectively, all in the conventional manner. The lower ends of the side and end walls 168, 170 and 172, 174, respectively, terminate in an outwardly flaring continuous peripheral flange 176 disposed at right angles relative thereto and which is adapted to detachably rest on the upper ends of the side and end walls 16, 18 and 20, 22, respectively, of the roasting pan 12 to support the cover member 164 in elevated position thereon. The outer marginal edge of the flange 176 terminates in a continuous downwardly turned stop flange 178 adapted for sliding engagement with the bead 24 to prevent inadvertent or accidental displacement of the cover member 164 relative to the roasting pan 12. The cover member 164 is completed through the provision of the conventional handles 180, 182 that are fixedly secured to the end walls 172, 174, all in the usual manner.

As is seen in FIGURE 2, the opening 30 may, if desired, slidably receive therethrough an elongated manually operated shaft 186, the shaft 186 having an inner end adapted to be received and detachably secured within the socket 94. The outer end of the shaft 186 is disposed exteriorly of the roasting pan 12 and is provided with a gripping button 188 normally formed of a heat insulating material. The shaft 186 is flexible and is loosely received through the opening 30 whereby the shaft may be flexed through manual operation to draw the standards 84, 86 away from their dead center position shown in FIGURE 3 to cause the disc valves 70, 72 to pivot about the pins 78 and thereby uncover the openings 50, 52 as the lever 92 and shaft 186 are moved in one direction. Movement of the lever 92 and shaft 186 in the opposite direction causes the disc valves to pivot and move in the opposite direction to close the openings 50, 52. It will be noted that as the disc valves 70, 72 are moved to their closed positions, the valves are housed within the arcuate tracks 189 which are secured to and depend from the underside of the closure wall 49.

As is seen in FIGURES 1 and 2, a plurality of brackets 190 are, optionally, secured to the bottom wall 14, the brackets 190 each carrying a transverse shaft 192 on which are mounted the rollers 194. The rollers 194 are adapted to track U-shaped substantially parallel rails 196 fixedly secured to the bottom wall 198 of a conventional oven 200 shown in phantom lines of FIGURE 2. The rollers 194 and track 196 serve to properly position the utensil 10 relative to the heat source (not shown).

Having described and illustrated the component elements of this invention in detail, its operation is deemed to be self-evident. However, in the interest of clarity, the following explanation is offered.

Let it be asumed that the component elements of the cooking utensil 10 are in their respective positions as illustrated in FIGURES 1 to 5, inclusive, and that the chamber 100 is substantially filled with a basting liquid or fluid 102. It will be understood, of course, that the term or expression "basting fluid or liquid" includes oils, meat and fowl juices, or other materials normally in a liquid state, and further, that such basting material may, in its initial form, be of a solid or semi-solid state (such as butter, for example) that may, under the influence of heat in the oven 200, be converted to its liquid state such as is indicated at 102. Assuming that the basting material 102 is in its liquid form, a small amount thereof will have passed through the screen 150 and into the funnel 142, rising therein to asume the common liquid level. As the oven 200 heats, the liquid 102 also heats and expands to rise upwardly through the conduit 134 and to pass upwardly through the leg section 154 of the fluid or liquid distributing conduit 152. The liquid or fluid is now forced, under continued oven heating, through the foot section 156 to pass into the nozzles 160, 162 for discharge over the fowl 300 shown in FIGURE 2. Meats, of course, could be substituted for the fowl 300 without changing the nature or scope of this invention. As long as heat is supplied to the basting liquid or fluid 102 and assuming that the basting liquid supply 102 is of sufficient volume to extend above the base of the side wall 144, this basic operation will continue.

To obtain the proper basting, the leg section 154 is adjusted vertically on the upper portion 136 of the conduit 134 to position the nozzles 160, 162 over the food 300 being roasted and the leg section 154 together with the foot section 156 and nozzles 160, 162 are turned about the common axis of the conduit 134 and leg section 154 to properly adjust the nozzles 160, 162 laterally of the roasting food 300 to thereby direct the nozzles 160, 162 towards that area of the food 300 which requires moistening. These adjustments are made, of course, before the utensil 10 is placed in the oven 200 and, before the cover member 164 is set in place on the roasting pan 12.

From the foregoing description, it is obvious that the basting operation will continue as long as the basting liquid 102 in the chamber 100 rises above the base of the funnel 142 and will discontinue when the liquid falls therebelow. With the value discs 70, 72 in their respective closed positions shown in FIGURES 1 to 5, inclusive, the basting fluids and food juices will collect in the pyramidic central section 450 without return to the chamber 100 thereby permitting the operator to roast without basting for such time as is required due to the exhaustion of the liquid 102 from the chamber 100. Thereafter, the valve discs 70, 72 may be pivoted from across the openings 50, 52 (see FIGURE 6) by drawing the shaft 186 and lever 92 to the right, as viewed in FIGURES 2, 3 and 5, to establish communication between the pyramidic central section 40 and the chamber 100. This permits the liquid and juices collected in the pyramidic central section 40 to flow into the chamber 100 and thereby to reestablish the basting cycle.

The valve discs 70, 72 could, if desired, be left in their respective open positions to enable substantially continuous basting, it being assumed that the return basting fluid is of sufficient volume to maintain its liquid level in the chamber 100 above the base of the funnel 142. The basting operation becomes intermittent and automatic under conditions wherein the normal liquid level falls below the base of the funnel 142 requiring heat to expand the liquid upwardly to fill the funnel for ultimate dispensing from the nozzles 160, 162 in the manner described above.

At the option of the operator, the cover member 164 may be left in the position shown in FIGURES 1 and 2 or removed therefrom as illustrated in FIGURE 5.

Having described and illustrated one embodiment of this invention in detail, it will be understood that the same is offered merely by way of example, and that this invention is to be limited only by the scope of the appended claims.

What is claimed is:

1. A roasting pan adapted to receive a basting liquid therein and apparatus disposed in said pan for basting foods being roasted therein, said pan comprising a normally horizontal bottom wall having an endless side wall projecting upwardly from the peripheral marginal edge thereof, an endless flange fixedly secured to and projecting inwardly from said side wall into said pan, said flange being disposed in vertically spaced relation relative to said bottom wall and marking the upper maximum level for said basting liquid, a grill disposed in said pan, means supporting said grill on said flange in vertically spaced relation relative to said bottom wall, a normally upright substantially hollow conduit disposed in said pan and having opposed open lower and upper ends, means disposed in said pan supporting said conduit in its upright position with said lower end of said conduit extending below said flange for immersion in said liquid, said upper end of said conduit extending above said food, and nozzle means at the upper end of said conduit discharging said liquid downwardly on said food as said liquid expands under heat and rises in said conduit.

2. A roasting pan adapted to receive a basting liquid therein an apparatus disposed in said pan for basting foods being roasted therein, said pan comprising a normally horizontal bottom wall having an inner side wall projecting upwardly from the peripheral marginal edge thereof, an endless flange fixedly secured to and projecting inwardly from said side wall into said pan, said flange being disposed in vertically spaced relation relative to said bottom wall and marking the upper maximum level for said basting liquid, a basting plate releasably supported on said flange, said basting plate having a centrally located downwardly displaced section to collect said basting liquid as the same falls from said food as the latter is being basted, a food supporting open grill releasably connected to and supported on said plate in vertically spaced relation relative thereto, an elongated conduit disposed in said pan, means on said plate supporting said conduit in upright position, said conduit having an open lower end extending below said flange for immersion in said liquid, said conduit having an upper end extending through said grill and above said food, and nozzle means at said upper end of said conduit to discharge said liquid downwardly on said food as said liquid expands under heat and rises in said conduit.

3. A roasting pan adapted to receive a basting liquid therein and apparatus disposed in said pan for basting food being roasted therein, said pan comprising a normally horizontal bottom wall having an endless side wall projecting upwardly from the peripheral marginal edge thereof, an endless flange fixedly secured to and projecting inwardly from said side wall into said pan, said flange being disposed in vertically spaced relation relative to said bottom wall and marking the upper maximum level for said basting liquid, a basting plate releasably supported on said flange, said basting plate having a centrally located depressed liquid collection section, valve means mounted on said section and operable to control the flow of liquid therethrough, a food supporting open grill releasably connected to and supported on said plate in vertically spaced relation relative thereto, an elongated hollow conduit disposed in said pan, means on said plate supporting said conduit in upright position, said conduit having an open lower end extending below said flange for immersion in said liquid, said conduit having an upper end extending through said grill and above said food, and nozzle means at said upper end of said conduit to discharge said liquid downwardly on said food as said liquid expands under heat and rises in said conduit.

4. A roasting pan including an apparatus for basting food disposed therein, said roasting pan comprising an elongated normally horizontal rectangular bottom wall from the peripheral marginal edges of which laterally and upwardly project opposed pairs of side and end walls, an endless open elongated substantially rectangular flange fixedly secured to said side and end walls and projecting inwardly of said pan in vertically spaced and substantially parallel relation relative to said bottom wall, said flange, bottom wall and said side and end walls extending therebetween defining a basting liquid receiving chamber, an elongated substantially rectangular basting plate having an inverted frusto-pyramidic central section including a pair of oppositely disposed downwardly converging side walls and a pair of oppositely disposed downwardly converging end walls, an elongated substantially rectangular closure wall disposed substantially in the plane of the frusto-pyramidic central section, the upper ends of said and end walls of said central section terminating in an outwardly flaring normally horizontal continuous flange, said outwardly flaring flange being supported on said open flange with said central section disposed in vertically spaced relation relative to said chamber, an elongated substantially open rectangular grill, means on said grill releasably connecting said grill with said plate in vertically spaced relation relative thereto, an upright conduit mounted on said plate, said conduit having an open lower end extending into said chamber for immersion in said liquid, said conduit having an upper end projecting through said grill above said food, and nozzle means on said upper end of said conduit to discharge said liquid downwardly on said food as said liquid is forced upwardly through said conduit.

5. A roasting pan including an apparatus for basting foods disposed therein, said pan comprising an elongated normally horizontal substantially rectangular bottom wall having upright side and end walls at the peripheral marginal edge thereof, an elongated substantially open rectangular first flange fixedly secured to said side and end walls and projecting inwardly of said pan in vertically spaced and substantially parallel relation relative to said bottom wall, said first flange, bottom and the side and end walls extending therebetween defining a substantially hollow rectangular basting liquid receiving chamber therebetween, an elongated substantially rectangular basting plate, said basting plate including an inverted pyramidic central section having an outwardly flaring normally horizontal continuous flange at the upper end thereof and a closure member disposed substantially in the plane of the frustum of said central section, said closure member having a plurality of openings extending transversely therethrough, valve means mounted on said closure member and adapted to open and close said openings, manually operable means for effecting substantial simultaneously the opening and closing of said valve means, said continuous outwardly flaring flange normally bearing on said first flange to support said central section in vertically spaced relation relative to said chamber, said central section collecting said basting fluid as the same falls on said roasting food, an elongated substantially open rectangular grill, means on said grill releasably engageable with means on said plate to support said grill in vertically spaced relation relative to said plate, an elongated first conduit having opposed open upper and lower ends, means on said plate supporting said conduit in an upright position with said lower end projecting below said first flange into said chamber for immersion in said liquid, an L-shaped liquid distributing conduit having its leg portion telescopically mounted over the upper end of said first conduit for vertical and rotational adjustment relative thereto, said leg portion being in open communication with one end of the foot portion of the liquid distributing conduit, said foot portion normally overhanging said grill in vertically spaced relation relative to said food thereon, and the other end of said foot portion being bifurcated and terminating in downwardly directed nozzles.

6. A roasting pan including an apparatus for basting food therein as defined in claim 5 wherein said manually operable means for said valves includes a reciprocable shaft having an end extending transversely through one of said end walls of said pan.

References Cited by the Examiner
UNITED STATES PATENTS

| | | | |
|---|---|---|---|
| 910,318 | 1/1909 | Schaefer | 99—346 |
| 1,349,302 | 8/1920 | Spitz | 99—346 |
| 2,164,072 | 6/1939 | Kitzeman | 99—346 |
| 2,352,292 | 6/1944 | Schaefer | 99—346 |
| 2,400,405 | 5/1946 | Getgey et al. | 99—346 |
| 3,055,287 | 9/1962 | Henry | 99—346 |

BILLY J. WILHITE, *Primary Examiner.*